United States Patent
Yanagidate

(10) Patent No.: US 8,081,226 B2
(45) Date of Patent: Dec. 20, 2011

(54) DIGITAL CAMERA SYSTEM WHICH ALLOWS A DIGITAL CAMERA UNIT TO COMMUNICATE WITH PERIPHERAL DEVICES VIA A HUMAN BODY

(75) Inventor: Masaharu Yanagidate, Sagamihara (JP)

(73) Assignee: Olympus Corporation, Tokyo (JP)

( * ) Notice: Subject to any disclaimer, the term of this patent is extended or adjusted under 35 U.S.C. 154(b) by 546 days.

(21) Appl. No.: 12/246,309

(22) Filed: Oct. 6, 2008

(65) Prior Publication Data

US 2009/0079845 A1  Mar. 26, 2009

Related U.S. Application Data

(63) Continuation of application No. PCT/JP2007/056882, filed on Mar. 29, 2007.

(30) Foreign Application Priority Data

Apr. 5, 2006  (JP) .................................. 2006-104008

(51) Int. Cl.
*H04N 5/232* (2006.01)
(52) U.S. Cl. ................................... 348/211.1
(58) Field of Classification Search ................ 455/41.1; 348/211.99, 211.1, 211.4, 211.6, 211.2
See application file for complete search history.

(56) References Cited

U.S. PATENT DOCUMENTS

| | | | |
|---|---|---|---|
| 5,432,597 A | 7/1995 | Parker et al. | |
| 6,104,913 A * | 8/2000 | McAllister | 455/41.1 |
| 2002/0048460 A1 | 4/2002 | Kitawaki | |
| 2003/0011684 A1 * | 1/2003 | Narayanaswami et al. | 348/207.99 |
| 2004/0152440 A1 * | 8/2004 | Yoda et al. | 455/403 |
| 2004/0174435 A1 | 9/2004 | Kondoh | |
| 2005/0001024 A1 * | 1/2005 | Kusaka et al. | 235/375 |
| 2006/0007319 A1 | 1/2006 | Kitawaki | |
| 2007/0109417 A1 * | 5/2007 | Hyttfors et al. | 348/211.99 |

FOREIGN PATENT DOCUMENTS

EP  0 869 669 A2  10/1998

(Continued)

OTHER PUBLICATIONS

International Search Report of PCT/JP2007/056882, date of mailing Jul. 10, 2007.

(Continued)

*Primary Examiner* — Jason Whipkey
(74) *Attorney, Agent, or Firm* — Westerman, Hattori, Daniels & Adrian, LLP

(57) ABSTRACT

A digital camera system includes a digital camera unit, and an authenticating unit in which unique setup control data of the digital camera unit is stored. The digital camera unit includes an imaging module that picks up an object image to generate image data, a first human body communication module that conducts communication via a human body, and a first controller that performs a setup operation related to at least one of a plurality of functions of the digital camera unit according to the setup control data received from the authenticating unit by the first human body communication module. In addition, the authenticating unit includes a second human body communication module that conducts communication via the human body, a setup control data storing unit in which the setup control data is stored, and a second controller that causes the setup control data to be transmitted to the digital camera unit via the second human body communication module.

11 Claims, 10 Drawing Sheets

FOREIGN PATENT DOCUMENTS

| | | |
|---|---|---|
| JP | 2002-132374 A | 5/2002 |
| JP | 2004-260800 A | 9/2004 |
| JP | 2006-81025 A | 3/2006 |
| JP | 2007-53664 A | 3/2007 |
| WO | 2006/018764 A1 | 2/2006 |

OTHER PUBLICATIONS

Supplementary European Search Report dated Aug. 5, 2011, issued in corresponding European Patent Application No. 07740320.2.

* cited by examiner

DIGITAL CAMERA SYSTEM WHICH ALLOWS A DIGITAL CAMERA UNIT TO COMMUNICATE WITH PERIPHERAL DEVICES VIA A HUMAN BODY

This application is a continuation application based on a PCT Patent Application No. PCT/JP2007/056882, filed Mar. 29, 2007, whose priority is claimed on Japanese Patent Application No. 2006-104008, filed Apr. 5, 2006. The contents of both the PCT Application and the Japanese Application are incorporated herein by reference.

FIELD OF THE INVENTION

The present invention relates to a digital camera system having a digital camera body and peripheral devices, and more particularly, to a digital camera system which allows the digital camera body to communicate with the peripheral devices via a user's body.

BACKGROUND OF THE INVENTION

There have been conventionally provided human body communication technologies for conducting communication using a human body as a communication line. For example, a patent document 1 discloses an example of a communication device which transmits image data generated by a digital camera to a printer or a storage device selected using a human body communication function via a communication device other than a human communication device.

Patent document 1: Japanese Patent Application Publication No. 2004-260800

DISCLOSURE OF THE INVENTION

Problems Solved by the Invention

In the above-described patent document 1, by specifying a destination for the image data using the human body communication, complicated operations to specify the destination are omitted, however, other functions do not proposed. The present invention is provided in view of this point, and an object of the present invention is to provide a variety of functions such as an enhancement of securities, a performance of initialization corresponding to the user, an operation of peripheral devices without cable and the like by applying the human body communication to a digital camera system including a digital camera and a variety of peripheral devices.

Means for Solving the Problem

The present invention relates to a digital camera system including a digital camera unit, and an authenticating unit in which unique setup control data of the digital camera unit is stored. The digital camera unit includes an imaging module that picks up an object image to generate image data, a first human body communication module that conducts communication via a human body, and a first controller that performs a setup operation related to at least one of a plurality of functions of the digital camera unit according to the setup control data received from the authenticating unit to the first human body communication module. In addition, the authenticating unit includes a second human body communication module that conducts communication via the human body, a setup control data storing unit in which the setup control data are stored, and a second controller that causes the setup control data to be transmitted to the digital camera unit via the second human body communication module.

In this digital camera system, at least one of the first and second controllers determines whether the communication via the human body can be conducted, on a periodical basis or depending on an image pickup operation of the digital camera unit.

In this digital camera system, the first controller sets the function to permit an operation without limitation or permit an operation on a limited basis, based on the setup control data.

In this digital camera system, at least one of the first and second controllers determines whether the communication via the human body can be conducted, when power is inputted.

In this digital camera system, the first controller sets a parameter of a function related to the object image pickup, based on the setup control data.

In this digital camera system, the setup control data storing unit is stored with the setup control data including authentication data to identify an operator and the parameter of the function related to the object image pickup, with the authentication data and the parameter being paired, and, the first controller updates the parameter of the function related to the object image pickup, the parameter being stored in the setup control data storing unit, via the first and second human body communication modules.

In this digital camera system, the setup control data storing unit is stored with the setup control data including authentication data to identify an operator and accounting data, with the authentication data and the accounting data being paired, and, the first controller limits the content of the function related to the object image pickup, based on the accounting data.

In this digital camera system, the setup control data storing unit is stored with address information of an image storing unit in which the image data generated by the digital camera unit is stored, and authentication data to identify an operator. The image storing unit is connected to the digital camera unit via an electrical communication network, and the address information and the authentication data are paired.

Furthermore, the present invention provides a digital camera system including a digital camera unit, and an operation terminal unit that operates the digital camera unit remotely. The digital camera unit includes an imaging module that picks up an object image to generate image data, a first human body communication module that conducts communication via a human body, and a first controller that performs an operation according to an operation instruction to control at least one of the timing of a shutter and a zoom function of a lens. The shutter and the lens are provided within the imaging module, and information related to the timing and the zoom are received from the operation terminal unit by the first human body communication module. In addition, the operation terminal unit includes a second human body communication module that conducts communication via the human body, an input unit that inputs the operation instruction, and a second controller that causes the operation instruction to be transmitted to the digital camera unit via the second human body communication module.

Furthermore, the present invention provides a digital camera system including a digital camera unit, and a flash unit that provides a flash function to the digital camera unit. The digital camera unit includes an imaging module that picks up an object image to generate image data, a first human body communication module that conducts communication via a human body, and a first controller that causes a flash initiation instruction to control the flash timing of the flash unit to be transmitted to the flash unit via the first human body communication module. In addition, the flash unit includes a second human body communication module that conducts communication via the human body, and a second controller that controls the flash based on the flash initiation instruction received from the digital camera unit by the second human body communication module.

Advantageous Effects of the Invention

According to the present invention, since the human body communication is conducted between the digital camera unit and the authenticating unit, it is possible to control setup of the digital camera unit with a simple procedure.

In addition, since it is possible to operate the digital camera unit remotely using the human body communication conducted between the digital camera unit and the operation terminal unit, wirings are not needed, thereby improving convenience. In addition, since it is possible to inform the flash unit of the flash timing using the human body communication conducted between the digital camera unit and the flash unit, wiring is not necessary, thereby improving convenience.

DESCRIPTION OF THE REFERENCE NUMERALS

Figure 1:
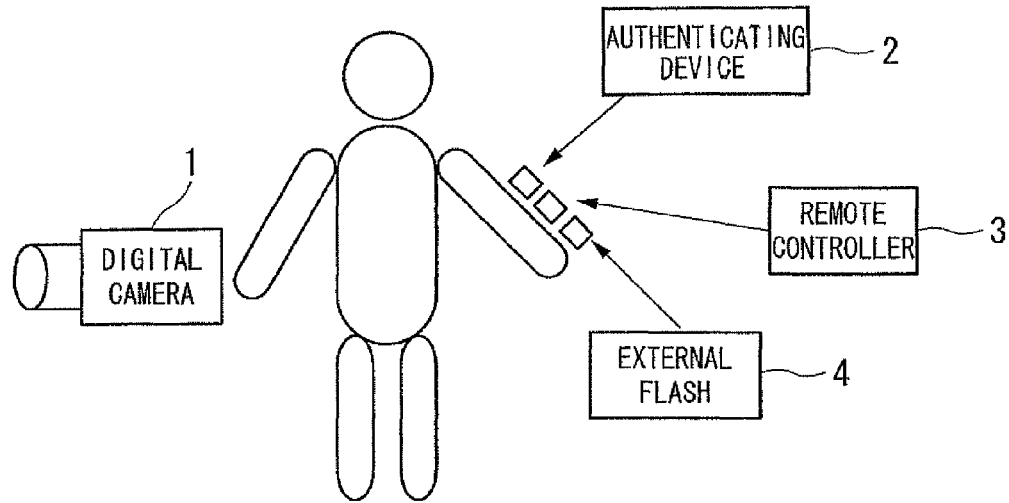
FIG. 1 is a block diagram showing a configuration of a digital camera system according to a first embodiment of the invention.

1 Digital camera,
2 Authenticating device
3 Remote controller
4 External flash
5, 116 Imaging module
9, 23, 29, 37, 112, 122 CPU
11, 16, 25, 34 Human body communication module
103 Authentication accounting device
104 fixed camera
108 Image storing device
110 Human body communication part

DETAILED DESCRIPTION OF PREFERRED EMBODIMENTS

Hereinafter, preferred embodiments of the invention will be described with reference to the accompanying drawings. First, a first embodiment of the invention will be described with reference to FIGS. 1 to 16. In the first embodiment, a case where the invention is applied to a digital camera system having a digital camera, an authenticating device, a remote controller and an external flash device will be illustrated.

FIG. 1 shows a configuration of the digital camera system according to the first embodiment of the invention. The digital camera system includes a digital camera 1 (digital camera unit) having an image pickup function, an authenticating device 2 (authentication unit) that stores an ID of a user and setup information of the digital camera 1, a remote controller 3 (operation terminal unit) that operates the digital camera 1 remotely), and an external flash device 4 (light emitting unit) that flashes according to a timing signal from the digital camera 4. These devices are each designed to have a human body communication function to allow communication among the devices via a human body. In this digital camera system, the digital camera 1 is requisite, and the authenticating device 2, the remote controller 3 and the external flash device 4 are optional. In accordance with the desired function, the authenticating device 2, some or all of the remote controller 3 and the external flash device 4 may be in combination with the digital camera 1 to construct the digital camera system.

Figure 2:
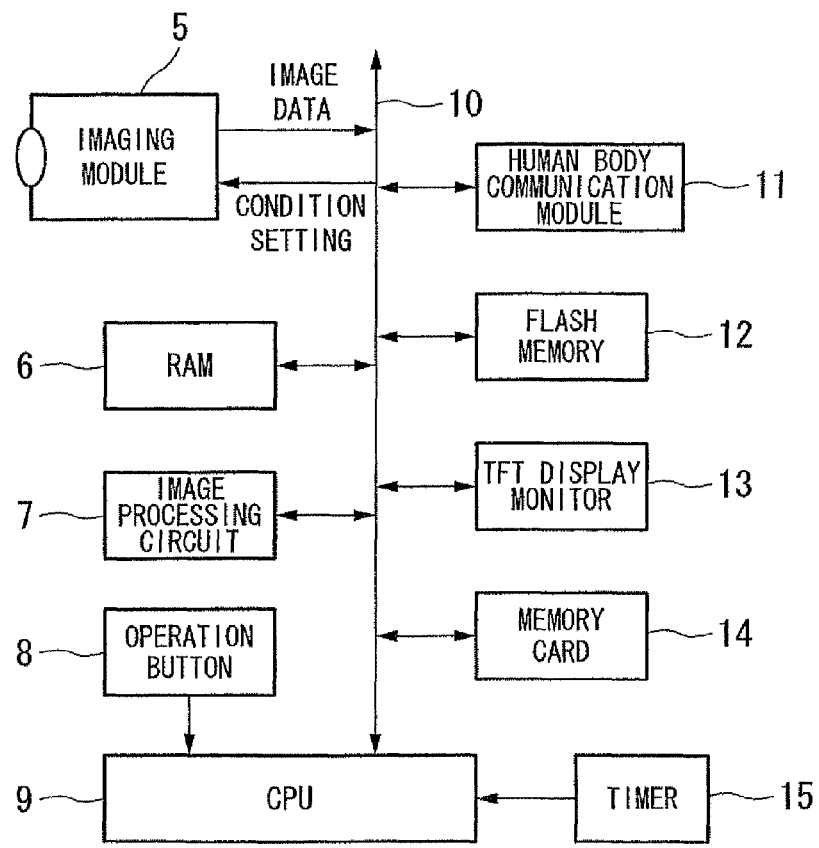
FIG. 2 is a block diagram showing a configuration of a digital camera included in the digital camera system according to the first embodiment of the invention.

Now, the configuration and operation of each device will be described with reference to FIGS. 2 to 5. FIG. 2 shows the configuration of the digital camera 1. First, functions of components of the digital camera 1 will be described. An imaging module 5 has an imaging device such as a CCD (charge-coupled device). According to settings from a CPU 9 (first controller), the imaging module 5 picks up an image to generate image data and transmits the generated image data to a RAM 6 via a data bus 10. The RAM 6 is a work memory that temporarily stores data. The RAM 6 temporarily stores the image data from the imaging module 5 and transmits the stored image data to an image processing circuit 7 at a predetermined timing.

The image processing circuit 7 is a circuit that creates display data for display of an image on a TFT display monitor 13 and storage data stored in a memory card 14. The display data is processed by the image processing circuit 7, temporarily stored in the RAM 6, read from the RAM 6 at a predetermined timing, and then outputted to the TFT display monitor 13. An image based on the display data is displayed on the TFT display monitor 13. In addition, the storage data is processed by the image processing circuit 7 and then transmitted to and stored in the memory card 14.

An operation button 8 is connected to a general-purpose IO terminal of the CPU 9 and is operable to output a signal indicating an instruction from an operator, such as a shutter trigger or an update request of setup data, to the CPU 9.

The CPU 9 operates according to a program stored in a flash memory 12. The CPU 9 controls various operations to be performed according to the instruction from the operator through the operation button 8, or states of the components of the digital camera 1 such as communication contents of a human body communication module 11 (first human body communication module) and an interrupt request of a timer 15. The data bus 10 is a transmission path of various kinds of data. The human body communication module 11 uses a human communication function to conduct data communication with human body communication modules provided within the authenticating device 2, the remote controller 3 and the external flash device 4. The human body communication modules of the devices 2, 3 and 4 can receive data except when in transmission operation. In addition, the digital camera 1 plays the leading role in communicating between the peripheral devices and controls the system communication as a whole.

The data received in the human body communication module 11 is automatically stored in a receiving buffer provided within the human body communication module 11. In the transmission operation, when data in a transmitting buffer provided within the human body communication module 11 is updated, the updated data is automatically transmitted. The flash memory 12 is a readable/writable non-volatile memory and is stored with a program for operation of the CPU 9, operation setting register values, a list of IDs of authorized operators, etc. The operation setting registers in the flash memory 12 are registers for setting operation contents of the digital camera 1, and the CPU 9 controls the operation of the digital camera 1 according to contents of the operation setting registers.

The TFT display monitor 13 displays image data during and after picking-up of an image, and menus for control of the digital camera 1. The memory card 14 is a detachable card-like recording medium that stores the image data after picking-up of the image. As described above, the storage data created in the image processing circuit 7 is written into the memory card 14 via the data bus 10. The timer 15 is a circuit that periodically generates a timer interrupt for the CPU 9. When the timer interrupt is generated, the CPU 9 performs a predetermined timer interrupt process which will be described in detail later.

Next, an operation of the digital camera 1 at the time of power input and pick-up of an image will be described. When the digital camera 2 is powered on, the digital camera 1 conducts communication with the authenticating device 2 via the human body communication module 11 to perform an authentication process and an initial setting process. In operation, if an operation mode is set to be a remote controlling mode, some of the operation of the digital camera 1 is performed based on an instruction from the remote controller 3. The instruction from the remote controller 3 is transmitted to the CPU 9 via the human body communication module 11, and the CPU 9 controls the operation of the digital camera 1 according to the instruction from the remote controller 3. In addition, if use of the external flash device 4 is set, data for operation condition settings and flashing timing control for the external flash device 4 are transmitted to the external flash device 4 via the human body communication module 11.

In the image pickup operation, the imaging module 5 picks up an image based on settings by the CPU 9 and outputs image data. The image data is stored once in the RAM 6 via the data bus 10, sequentially read into the image processing circuit 7, and then processed according to image pickup conditions. For example, in a through image display condition before shutter trigger operation, the image data is successively outputted from the imaging model 5, and then successively processed by the image processing circuit 7 to display an image on the TFT display monitor 13.

In addition, in the shutter trigger operation, the imaging module 5 outputs one of the image data, and the image processing circuit 7 creates the display data to be outputted to the TFT display monitor 13 and the storage data to be stored in the memory card 14. In the image pickup operation, the CPU 9 reads the operation setting registers stored in the flash memory 12 and sets the operation of the imaging module 5 according to the read operation setting registers. Accordingly, an image pickup condition is set.

Figure 3:
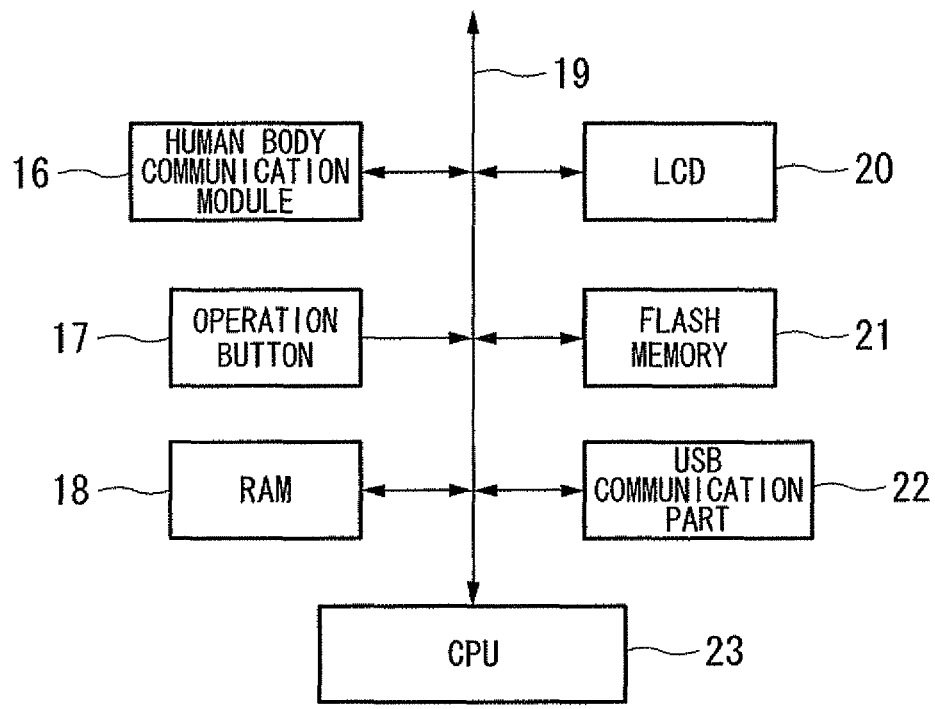
FIG. 3 is a block diagram showing a configuration of an authenticating device included in the digital camera system according to the first embodiment of the invention.

Next, the authenticating device 2 will be described. FIG. 3 shows a configuration of the authenticating device 2. The authenticating device 2 stores authentication information (authentication data) such as an ID of a user and setup information (setup data) on the digital camera 1. The authenticating device 2 communicates with the digital camera 1 via a human body and performs processes such as operation authentication (user authentication) or initial setting at the time of use initiation of the digital camera 1, operator re-authentication or re-setting at the time of changing a user in the course of use of the digital camera 1, update of the setup information and so on. The authentication information is information used for an operator authentication process. In addition, the setup information is information on image quality, side light mode, setup values of ISO sensitivity (parameters of function related to pickup of an object image and so on, which are used for image pickup of the digital camera 1.

A human body communication module 16 (second human body communication module) uses a human body communication function to conduct data communication with the human body communication module 11 of the digital camera 1. An operation button 17 is an input button to allow an operator to manually set the authentication information and the setup information. A RAM 18 is a work memory that temporarily stores data being processed. A data bus 19 is a transmission path of various kinds of data. An LCD 20 is a display unit that displays operation contents.

A flash memory 21 is a readable/writable nonvolatile memory stored with a program for operation of a CPU 23 (second controller), the authentication information and the setup information. The authentication information and the setup information are stored in the flash memory 21 in pair, that is, in association therebetween. For example, setup information of operators can be distinguished by their private IDs. The authentication information and the setup information are set by means of the operation button or an USB communication part 22 and details thereof are displayed on the LCD 20. The USB communication part 22 is a communication circuit that conducts USB communication with external devices and allows input/output of the authentication information and the setup information from the external devices such as a personal computer. The CPU 23 controls the authenticating device 2 according to a program stored in the flash memory 21.

Figure 4:
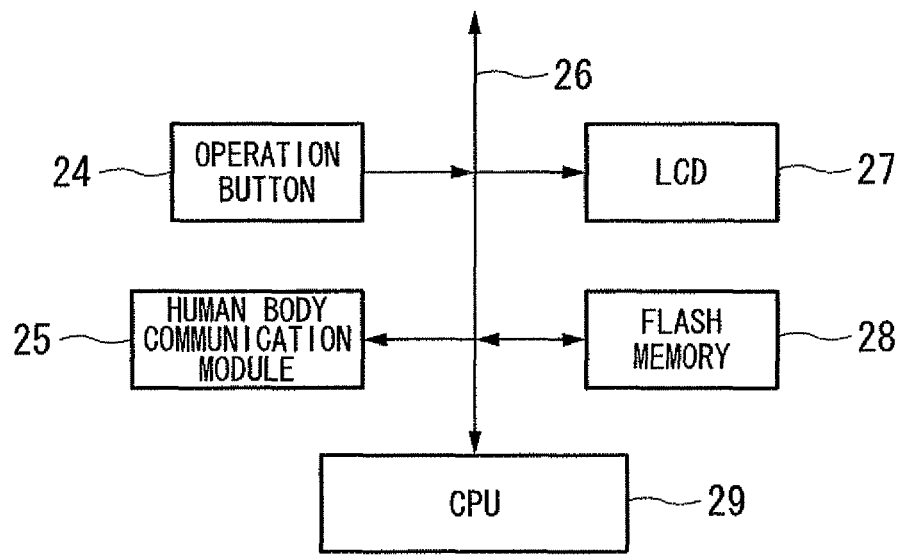
FIG. 4 is a block diagram showing a configuration of a remote controller included in the digital camera system according to the first embodiment of the invention.

Next, the remote controller 3 will be described. FIG. 4 shows a configuration of the remote controller 3. The remote controller 3 is a device that remotely operates the digital camera 1. An operation button 24 (input part) is an input button to allow an operator to input an instruction to operate the digital camera 1. This operation instruction is information to control a timing of a shutter, a zoom of a lens and the like in the imaging module 5. A human body communication module 25 (second human body communication module) uses a human body communication function to conduct data communication with the human body communication module 11 of the digital camera 1.

A data bus 26 is a transmission path of various kinds of data. An LCD 27 is a display unit that displays operation contents. A flash memory 28 is a readable/writable nonvolatile memory stored with a program for operation of a CPU 29 (second controller). The CPU 29 controls the remote controller 3 according to a program stored in the flash memory 28. When the operation button 24 is operated, a signal according to operation contents is outputted. The CPU 29 detects the operation contents based on the signal, causes the operation contents to be displayed on the LCD 27, and transmits an operation instruction according to the operation contents to the digital camera 1 via the human body communication module 25.

Figure 5:
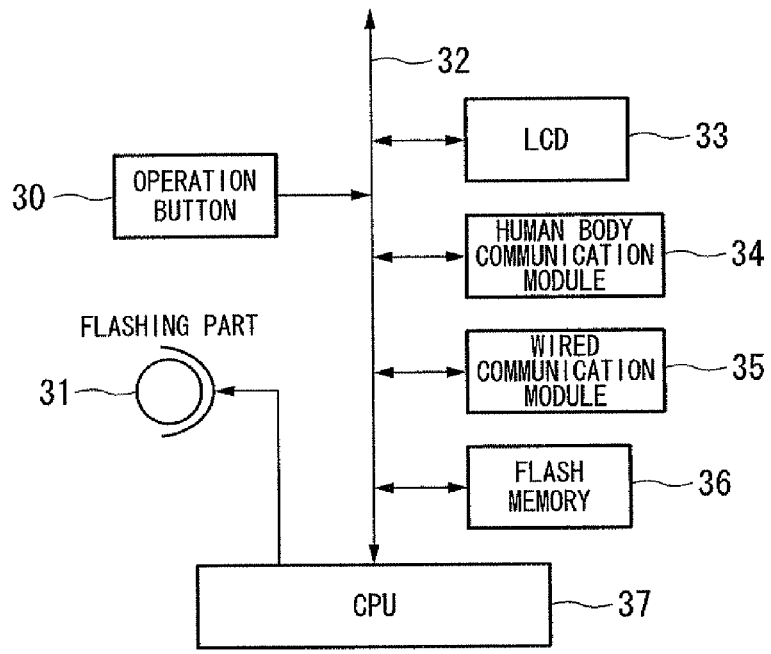
FIG. 5 is a block diagram showing a configuration of an external flash device included in the digital camera system according to the first embodiment of the invention.

Next, the external flash device 4 will be described. FIG. 5 shows a configuration of the external flash device 4. The external flash device 4 is a device that flashes based on an instruction from the digital camera 1. An operation button 30 is an input button to allow an operator to input information related to change of an operation mode of the external flash device 4 or manual setting of flashing conditions. The information input through the operation button 30 is detected by a CPU 37 (second controller) and stored in a flash memory 36. This information is reflected on a flashing operation.

The flashing operation is performed by a flashing part 31. The flashing part 31 is directly connected to the CPU 37 and flashes according to an instruction from the CPU 37. A data bus 32 is a transmission path of various kinds of data. An LCD 33 is a display unit that displays the operation information such as an operation mode. A human body communication module 34 (second human body communication module) uses a human body communication function to conduct data communication with the human body communication module 11 of the digital camera 1. The flashing operation may be performed with either a signal using human body communication or a signal using wired communication. Accordingly, the human body communication module 34 and a wired communication module 35 are provided within the external flash device 4, and both of the modules 34 and 35 can receive an instruction from the digital camera 1.

The flash memory 36 is a readable/writable non-volatile memory stored with a program for operation of the CPU 37. In addition, the information on the change of the operation mode or the flashing condition, which is inputted through the operation button 30 or received through the human body communication module 34 or the wired communication module 35 is stored in the flash memory 36. The CPU 37 controls the external flash device 4 according to the program stored in the flash memory 36.

When the external flash device 4 flashes, the CPU 1 of the digital camera 1 transmits a flash initiation instruction to control the flash timing of the external flash device 4 via the human body communication module 11. The human body communication module 34 of the external flash device 4 receives the flash initiation instruction and outputs it to the CPU 37. The CPU 37 instructs the flashing part 31 to flash based on the flash initiation instruction. The flashing part 31 flashes on this instruction.

Next, details of the operations of the above devices will be described with reference to FIGS. 6 to 17. FIGS. 6 to 11 are flow charts illustrating the operation of the digital camera 1. In these flow charts, the CPU 9 operates as a subject according to the program stored in the flash memory 12.

Figure 6:
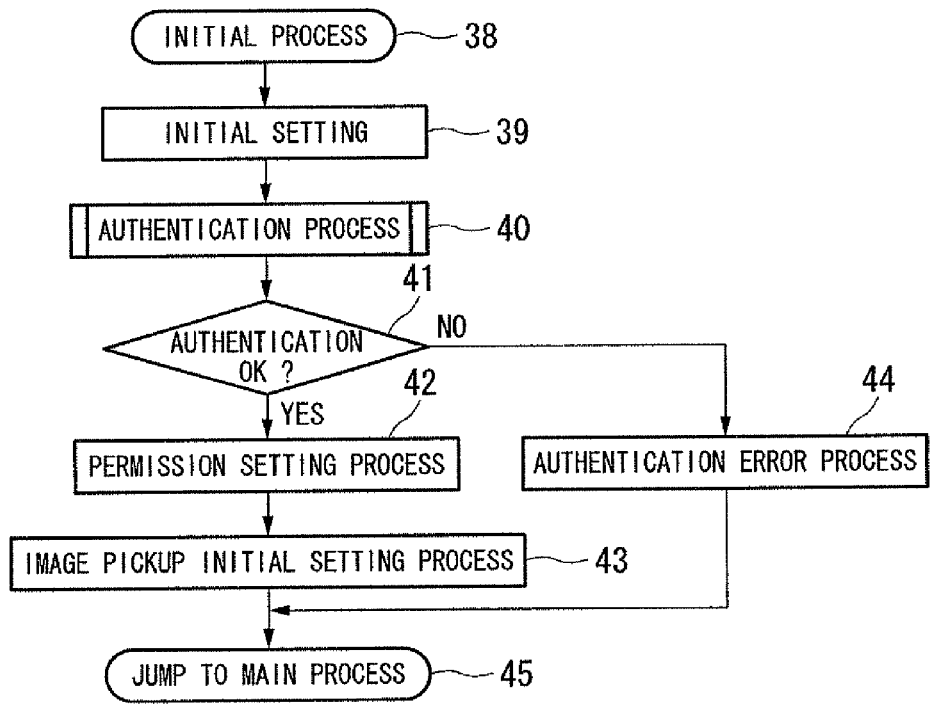
FIG. 6 is a flow chart illustrating an operation (initial process) of the digital camera included in the digital camera system according to the first embodiment of the invention.

FIG. 6 is a flow chart illustrating an initial process 38. The initial process 38 is a process performed immediately after the digital camera 1 is powered on. First, the CPU 9 performs an initial setting operation 39 to turn hardware in the digital camera 1 into a predetermined operation state.

Subsequently, the CPU 9 conducts communication with the authenticating device 2 via the human body communication module 11 to perform an authentication operation 40 to identify the operator and set certain limitations. As will be described in more detail later, the CPU 9 receives detailed information related to an ID of an operator, the term of validity, limitations, etc. from the authentication device 2 via the human body communication module 11, and collates the received ID with an ID of an authorized operator, which is preset in the digital camera 1, or checks the term of validity.

Based on a result of the authentication operation 40, it is determined whether or not the operator who operates the digital camera 1 is authorized. If it is determined that the operator is authenticated, a permission setting operation 42 is performed. In the permission setting operation 42, the CPU 9 permits the operator to pick up an image and sets limitations to the operator. The limitations include designation of an image storing holder, designation of a reference holder, limitation to erase of image data, limitation to the amount of usable data, etc. By setting the limitations, a particular function (for example, conservation or edition of image data) is permitted to be performed on a limited basis. In the digital camera 1, the limitations are unchangeable items.

Subsequently, an image pickup initial setting operation 43 is performed. In the image pickup initial setting operation 43, the CPU 9 receives various setup information of image quality, side light mode, ISO sensitivity and so on related to an image pickup operation from the authenticating device 2 via the human body communication module 11, and performs an initial setting operation related to the image pickup of the digital camera 1 based on the setup information. Setup items in the image pickup initial setting operation 43 are items changeable in use.

After completing the image pickup initial setting operation for the operator, the CPU 9 instructs operation initiation and jumps to a main process 45. The main process is an infinite loop process in which hardware such as the imaging module 5, the operation button 8 and the like are sequentially monitored and corresponding operations are successively performed. For example, if the main process is stopped and an interrupt operation is performed, the main process is restarted in a return operation following the interrupt operation, and thus the infinite loop continues.

On the other hand, if it is determined in the authentication operation 40 that the operator is not authenticated, an authentication error process 44 is performed, and then, the CPU 9 sets a standby operation to start in the main process performed after completing the initial process 38, and then jumps to the main process 45. The standby operation continues until communication with the authenticating device 2 is confirmed by the authentication operation 40 by a periodical timer interrupt process which will be described later.

Figure 7:
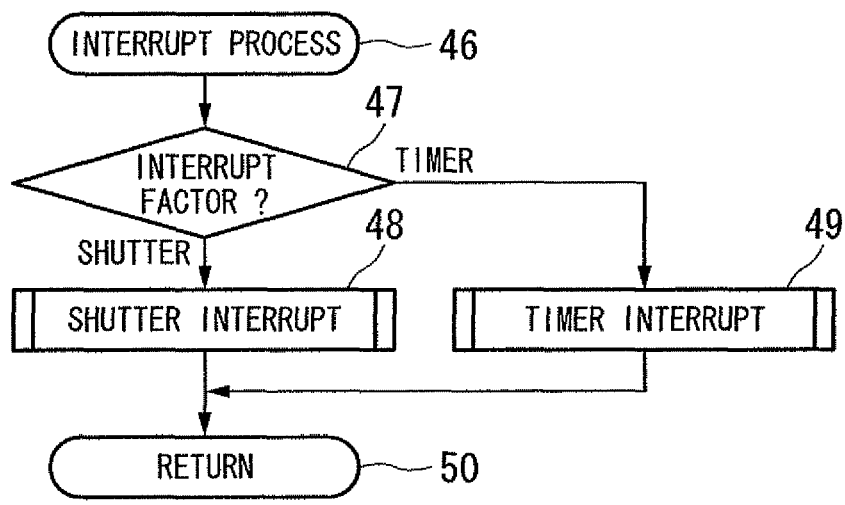
FIG. 7 is a flow chart illustrating an operation (interrupt process) of the digital camera included in the digital camera system according to the first embodiment of the invention.

FIG. 7 is a flow chart illustrating an interrupt process. The interrupt process is a process performed when an interrupt signal is generated in an interrupt detection terminal (not shown) of the CPU 9. In this embodiment, the interrupt process is performed in correspondence to a shutter interrupt operation performed when a shutter button is pushed and a timer interrupt operation performed when a timer signal from the timer 15 is ON.

When the interrupt signal is generated, the CPU 9 stops the main process being performed by that time, and performs an interrupt process 46. First of all, the CPU 9 analyzes an interrupt factor 47 and performs a shutter interrupt process 48 or a timer interrupt process 49 according to the analyzed interrupt factor. After performing the interrupt process 48 or 49, a return operation 50 is performed to return to a process before the stop of the main process.

Figure 8:
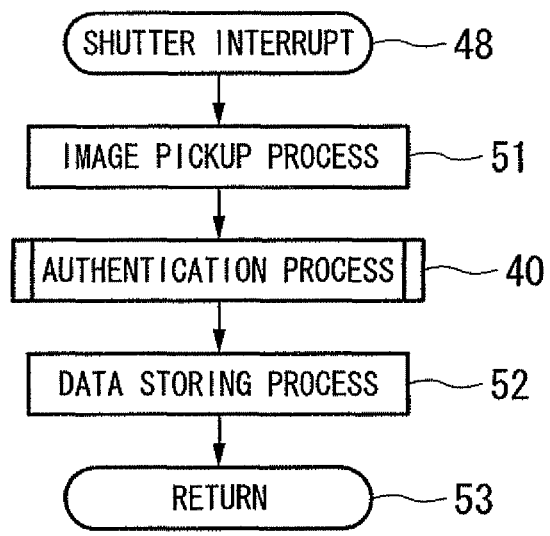
FIG. 8 is a flow chart illustrating an operation (shutter interrupt process) of the digital camera included in the digital camera system according to the first embodiment of the invention.

FIG. 8 is a flow chart illustrating the shutter interrupt process 48. The shutter interrupt process 48 is a process performed when the shutter button is pushed. In the shutter interrupt process 48, first, an image pickup process 51 is performed, the imaging module 5 acquires image data, the image processing circuit 7 creates display data and storage data, and the TFT display monitor 13 displays an image. Thereafter, an operator is confirmed (authenticated) according to the authentication operation 40.

After performing the authenticating operation 40, a data storing operation 52 is performed to create additional data (EXIF) corresponding to the operator and store the image data in the image storing holder of the memory card 14.

According to the data storing operation 52, image data added with operator information is stored in a holder corresponding to the operator. For example, if the operator has changed, since the operator ID is updated (changed) according the authentication operation 40, the image storing holder is changed according to the data storing operation 52 and the image data is stored in a holder corresponding to the operator at the time of picking up an image.

If authentication is unsuccessful in the authentication operation 40 (for example, an operator ID transmitted from the authenticating device 2 does not exist in the operator ID list of the digital camera 1), the image storing holder is changed to a default holder. Image data of the default holder is allowed to be moved by an authenticated operator after picking up the image. Accordingly, an image can be picked up by operators other than the authenticated operator. After completing the data storing operation 52, a return operation 53 is performed to return to the process before the stop.

Figure 9:
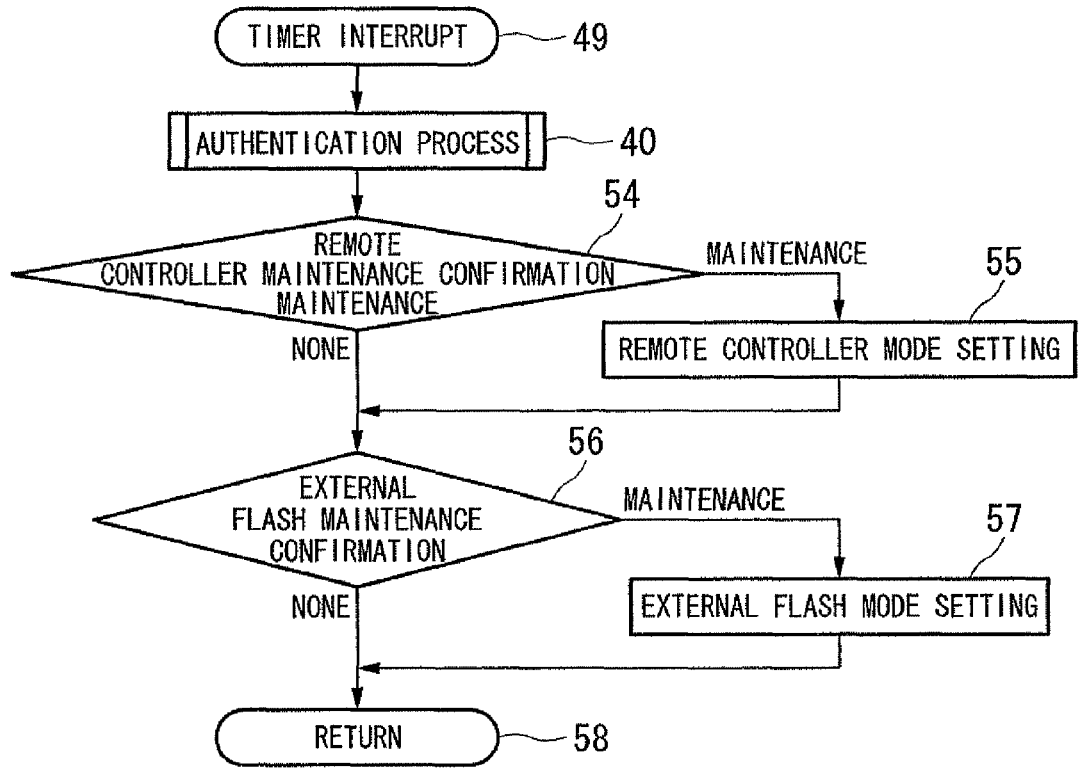
FIG. 9 is a flow chart illustrating an operation (timer interrupt process) of the digital camera included in the digital camera system according to the first embodiment of the invention.

FIG. 9 is a flow chart illustrating the timer interrupt process 49. The timer interrupt process 49 is a process to check the connection of the digital camera 1 with the authenticating device 2, the remote controller 3 and the external flash device 4. Since timer interrupt is periodically generated by the timer 15, the timer interrupt process 49 is also periodically performed. First of all, the CPU 9 communicates with the authenticating device 2 in the authentication operation 40 to check an operator.

Subsequently, the CPU 9 communicates with the remote controller 3 in a remote controller maintenance confirmation operation 54 to check whether or not the remote controller 3 is maintained by the operator (in other words, whether or not the CPU 9 can communicate with the remote controller 3 via a human body). This check is made by, for example, determining whether or not a response signal to a signal transmitted from the CPU 9 to the remote controller 3 via the human body communication module 11 is received in the CPU 9. If it is confirmed that the remote controller 3 is maintained by the operator, a remote controlling mode setting operation 55 is performed to set the operation mode of the digital camera 1 to be in a "remote controlling mode." In the "remote controlling mode," the remote controller 3 can instruct a zoom operation and a shutter operation.

Subsequently, the CPU 9 communicates with the external flash device 4 in an external flash maintenance confirmation operation 56 to check whether or not the external flash device 4 is maintained by the operator (in other words, whether or not the CPU 9 can communicate with the external flash device 4 via the human body). In the external flash maintenance confirmation operation 56, if the flash of the digital camera 1 is set as an external flash, the CPU 9 communicates with the external flash device 4 to check whether or not the external flash device 4 is held by the operator. This check is also made by determining whether or not a response signal to a signal transmitted from the CPU 9 to the external flash device 4 via the human body communication module 11 is received in the CPU 9.

If it is confirmed that the external flash device 4 is held by the operator, an external flash mode setting operation 57 is performed to set the flash mode of the digital camera 1 to "external flash use." In the "external flash use," an image is picked up using flash by the external flash device 4.

Figure 10:
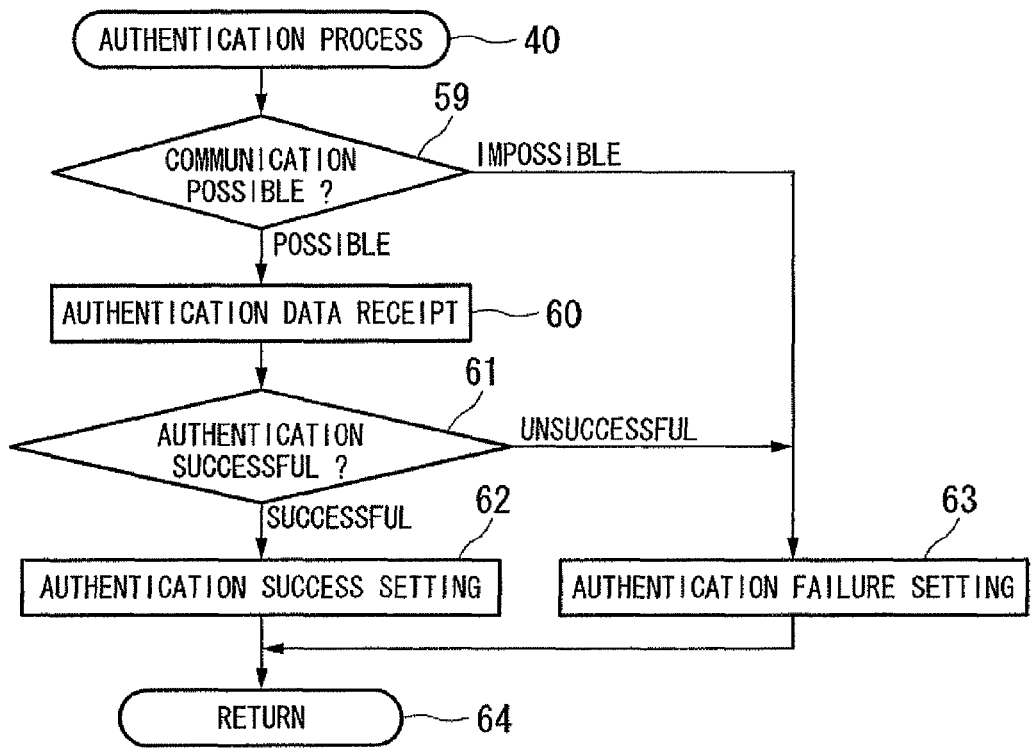
FIG. 10 is a flow chart illustrating an operation (authentication process) of the digital camera included in the digital camera system according to the first embodiment of the invention.

FIG. 10 is a flow chart illustrating the authentication operation 40. In the authentication operation 40, it is checked whether or not communication with the authenticating device 2 can be conducted 59. This confirmation is made by determining whether or not a response signal to a signal transmitted from the CPU 9 to the authenticating device 2 via the human body communication module 1 is received in the CPU 9. The confirmation about whether or not communication between the digital camera 1 and the authenticating device 2 can be conducted by determining whether or not a response signal to a signal transmitted from the CPU 23 of the authenticating device 2 to the digital camera 1 via the human body communication module 16 is received in the CPU 23.

If communication with the authenticating device 2 can be conducted, an authentication data receiving operation 60 is performed. In the authentication data receiving operation 60, the CPU 9 requests the authenticating device 2 to provide authentication data via the human body communication module 11. If communication with the authenticating device 2 can not be conducted, an authentication failure setting operation 63 is performed. After the authentication data receiving operation 60, the CPU 9 performs operator authentication by determining whether or not an operator ID included in the authentication data exists in the operator ID list pre-stored in the flash memory 12.

If the operator authentication is unsuccessful (that is, if an operator ID transmitted from the authenticating device 2 does not exist in the operator ID list of the digital camera 1), the authentication failure setting operation 63 is performed like the case where the communication with the authenticating device 2 can not be conducted. When the authentication failure setting operation 63 is performed, a return operation 64 is performed to perform subsequent predetermined operations. If the operator authentication is successful, an authentication success setting operation 62 is performed. In the authentication success setting operation 62, a flag that indicates authentication success is set into the RAM 6 and the authentication data such as the operator ID are stored in a predetermined location within the flash memory 12. After completing the authentication success setting operation 62, the return operation 64 is performed to return to the operations before the stop.

Figure 11:
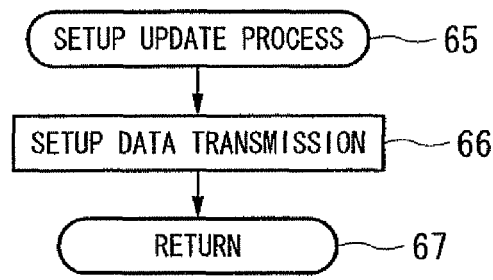
FIG. 11 is a flow chart illustrating an operation (setup update process) of the digital camera included in the digital camera system according to the first embodiment of the invention.

FIG. 11 is a flow chart illustrating a setup update process 65. The setup update process 65 is a process performed in the main process based on an instruction inputted through the operation button 8. In the setup update process 65, setup contents of items related to the image pickup operation of the digital camera 1 at the time of operation initiation are transmitted to the authenticating device 2, and setup data in the authenticating device 2 are updated. When the operation button 8 is operated to instruct the update of the setup contents, the CPU 9 performs a setup data transmission operation 66. In the setup data transmission operation 66, the CPU 9 reads the setup contents at the execution time from the operation setting register in the flash memory 12 and transmits the read setup contents to the authenticating device 2 via the human body communication module 11. After transmission completion, a return operation 67 is performed to return to the operation before the stop. According to the setup data transmission operation 66, the operator can change a value of image pickup initial setting when power is inputted later.

Figure 12:
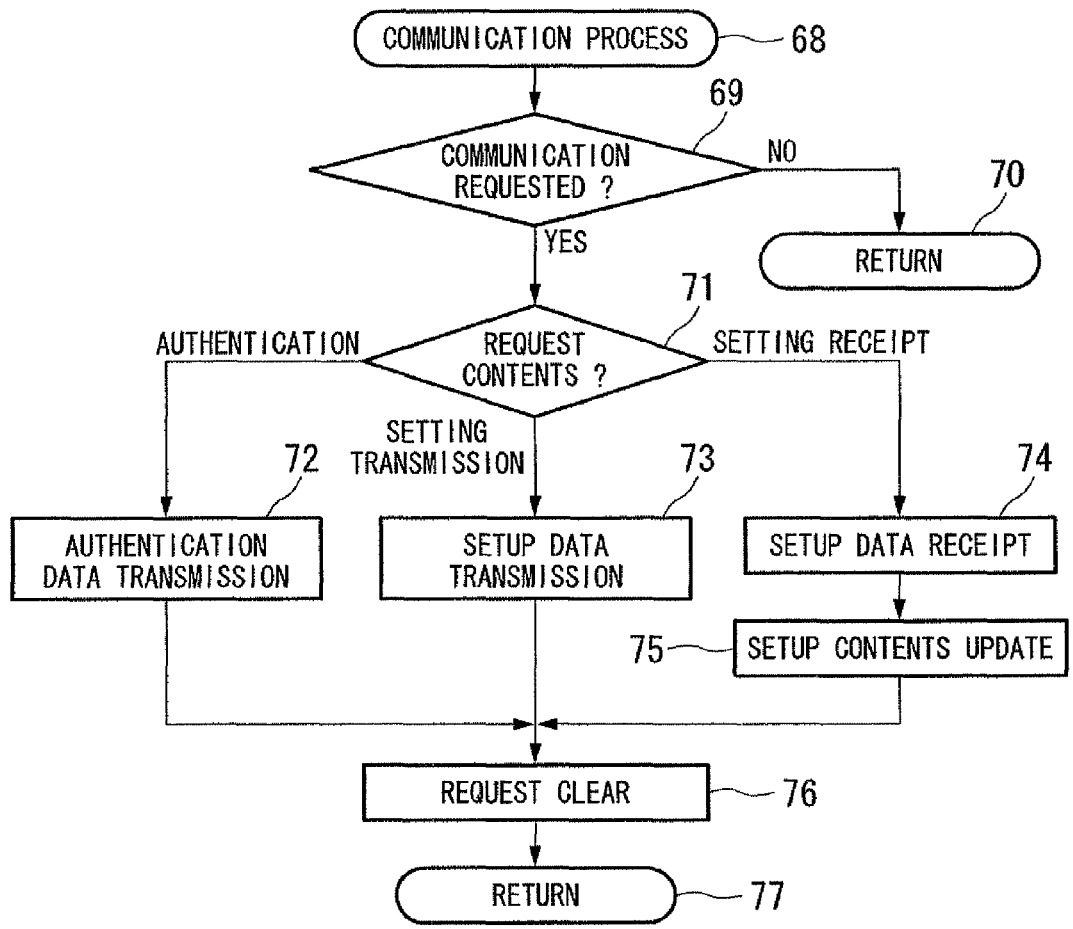
FIG. 12 is a flow chart illustrating an operation (communication process) of the authenticating device included in the digital camera system according to the first embodiment of the invention.

Next, a communication process of the authenticating device 2 will be described with reference to FIG. 12. FIG. 12 is a flow chart illustrating a communication process 68 in the authenticating device 2. The communication process 68 is a communication process between the authenticating device 2 and the digital camera 1 and is performed by the CPU 23 of the authenticating device 2 according to a program stored in the flash memory 21.

The communication process 68 is repeatedly performed in a short period in order to reduce the communication delay time. As described above, the transmission/receipt of communication data is automatically conducted between the human body communication module 11 of the digital camera 1 and the human body communication module 16 of the authenticating device 2. The communication process 68 is a process to set transmission data into a transmission/receipt buffer in the human body communication module 16 and store received data in the buffer. In the communication process 68, first of all, it is confirmed whether or not a communication request from the digital camera 1 is present (69).

If the communication request is not present, a return operation 70 is performed to return to the operations before the stop. If the communication request is present, the CPU 23 analyzes request contents in a request contents analyzing operation 71 and performs an operation corresponding to the contents. If the authentication data is requested to be transmitted, the CPU 23 performs an authentication data transmitting operation 72, reads the authentication data (for example, an operator ID, the term of validity, etc.) from the flash memory 21, and then transmits the read authentication data to the digital camera 1. After transmission completion, the CPU 23 clears the request contents in a request clearing operation 76, and then a return operation 77 is performed to return to the operations before stopping.

In addition, if the setup data is requested to be transmitted, the CPU 23 performs a setup data transmitting operation 73, reads the setup data from the flash memory 21, and then transmits the read setup data to the digital camera 1. When the setup data is requested to be transmitted, for example, an operator ID related to a current operator is received from the digital camera 1, and setup data corresponding to the operator ID is transmitted to the digital camera 1.

After transmission completion, the CPU 23 performs the request clearing operation 76 and then the return operation 77 to return to the operations before the stop.

In addition, when the setup data is requested to be transmitted, the CPU 23 performs a setup data receiving operation 74 and receives the setup data (including the operator ID) from the digital camera 1. The received setup data is stored and maintained in a predetermined location of the flash memory 21 when the next setup contents updating operation 75 is performed. After update completion, the CPU 23 performs the request clearing operation 76 and then the return operation 77 to return to the operations before the stop.

The setup data transmission request is made by operation of the digital camera 1 if an operator wants to change the current image pickup condition to other image pickup conditions stored in the authenticating device 2. The flash memory 21 of the authenticating device 2 is stored with a plurality of image pickup conditions such as the settings of famous photographers in addition to image pickup conditions set by the operator. These image pickup conditions may be read out according to a request by the user.

Figure 13:
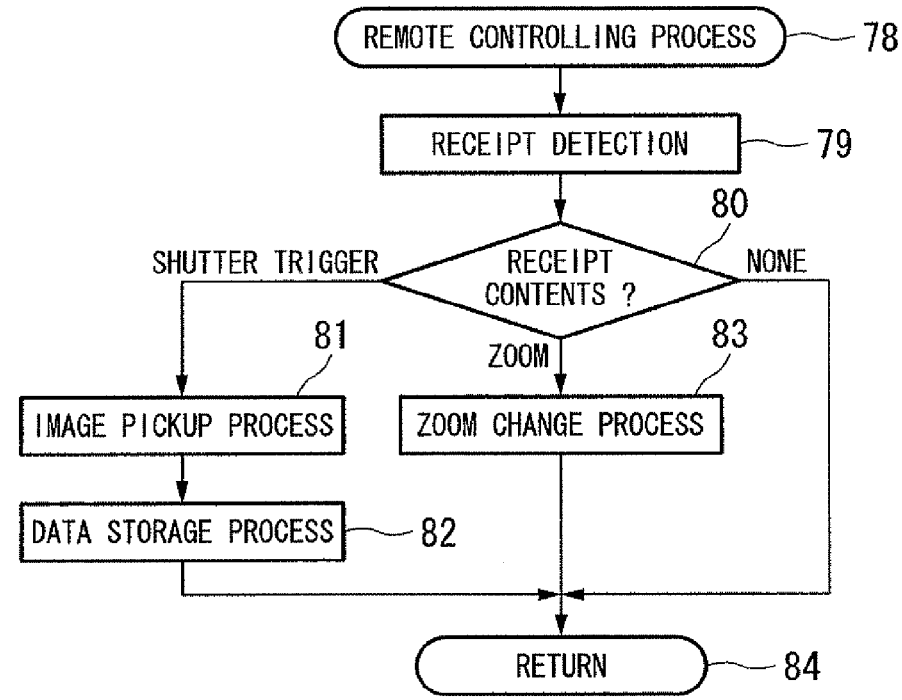
FIG. 13 is a flow chart illustrating an operation (remote controlling process) of the digital camera included in the digital camera system according to the first embodiment of the invention.
Figure 14:
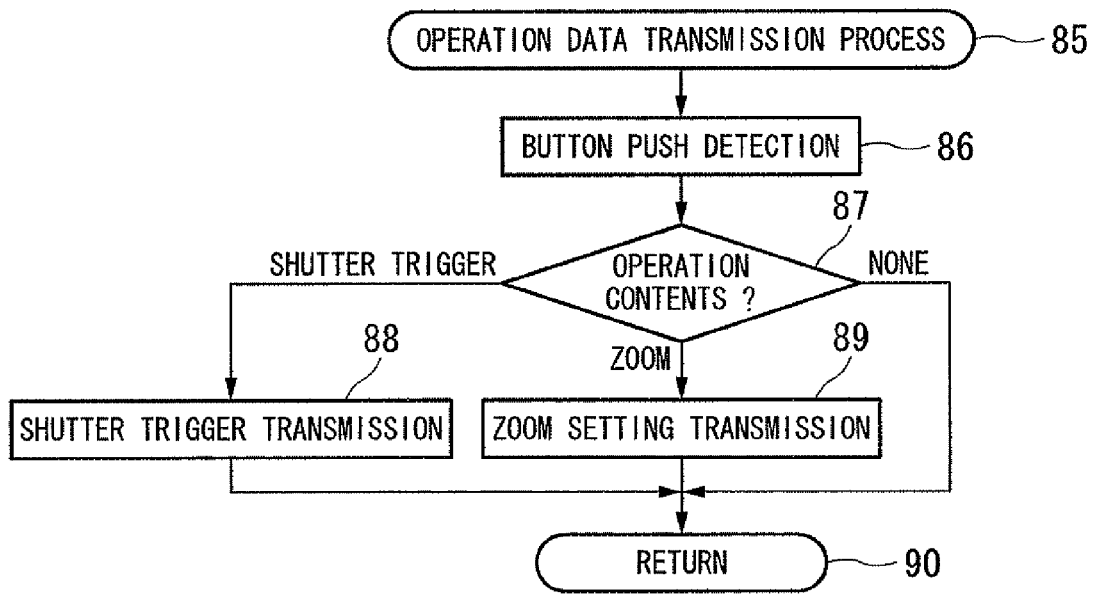
FIG. 14 is a flow chart illustrating an operation (operational data transmission process) of the remote controller included in the digital camera system according to the first embodiment of the invention.

Next, a remote controlling process will be described with reference to FIGS. 13 and 14. FIG. 13 is a flow chart illustrating a remote controlling process 78 to be performed by the digital camera 1 when the remote controller is used. FIG. 14 is a flow chart illustrating an operation data transmission process of the remote controller 3. Although the remote controller performs various operations corresponding to operations by the operation button 8 of the digital camera 1, only a shutter trigger operation and a zoom operation will be described in this embodiment.

First, a process of the digital camera 1 when the remote controller 3 is used will be described with reference to FIG. 13. As described above, when the operator carries the remote controller 3, the digital camera 1 detects the remote controller in the timer interrupt process 49 and enters the remote controlling mode. When the digital camera 1 enters the remote controlling mode, the remote controlling process 78 shown in FIG. 13 is called from the main process and is periodically performed.

The remote controlling process 78 is a process to analyze operation contents of the remote controller 3 and perform an operation corresponding to the operation contents. In the remote controlling process 78, the CPU 9 first performs a receipt detection operation 79 to read data from a receiving buffer of the human body communication module 11 in the digital camera 1. Subsequently, the CPU 9 analyzes the operation contents in a receipt content analyzing operation 80 based on the read data and performs an operation according to the analyzed operation contents. As described above, the human body communication module 11 always performs a receiving operation except when performing a transmitting operation. Accordingly, data transmitted from the remote controller 3 is automatically stored in the receiving buffer in the human body communication module 1.

As a result of the receipt content analyzing operation 80, if the data transmitted from the remote controller 3 is a shutter trigger instruction, like the process by regular shutter button push, the CPU 9 performs an image pickup operation 81 and a data storing operation 82, and then a return operation 84 is performed to return to the operations before the stop. In addition, if the data transmitted from the remote controller 3 is a zoom instruction, a zoom change operation 83 is performed. In the zoom change operation 83, according to contents of zoom operation instructed by the remote controller 3, the CPU 9 controls an optical system of the imaging module 5 of the digital camera 1 to perform a desired zoom operation, and then performs a return operation 84 to return to the operations before the stop. In addition, in the receipt content analyzing operation 80, if "no receipt data" is determined, the return operation 84 is performed to return to the operations before the stop.

Next, an operation of the remote controller 3 will be described with reference to FIG. 14. In the remote controller 3, the CPU 29 performs an operation data transmitting operation 85 periodically. In the operation data transmitting operation 85, the CPU 29 first performs a button push detection operation 86 to check whether or not the operation button 24 is pushed. In this embodiment, the operation button 24 includes a shutter operation button for shutter trigger operation and a zoom button for zoom operation.

If the shutter operation button is pushed, the CPU 29 performs a shutter trigger transmitting operation 88 to transmit a shutter trigger instruction to the digital camera 1 via the human body communication module 25. After transmission completion, a return operation 90 is performed to return to the operations before the stop. If the zoom button is pushed, the CPU 29 performs a zoom setup transmitting operation 89 to transmit a zoom instruction corresponding to the push of the zoom button to the digital camera 1 via the human body communication module 25. After transmission completion, the return operation 90 is performed to return to the operations before the stop. If the operation button 24 is not pushed, the return operation 90 is performed to return to the operations before the stop.

Next, a process when the external flash device 4 is used will be described. When the external flash device 4 is used, as described above, the flash of the digital camera 1 is set to be the external flash and the operation mode is set to be the external flash mode. When the operation mode is set to be the external flash mode, the CPU 9 of the digital camera 1 confirms the existence of the external flash device 4 through a human body communication process. If the existence of the external flash device 4 is confirmed, the CPU 9 of the digital camera 1 periodically performs a charging confirmation operation 91 in the main process to confirm a charging condition.

After charging completion and confirming that the flash is possible, if the shutter button is pushed in a situation where the flash is required, the digital camera 1 transmits a flash instruction to the external flash device 4 in the image pickup process 51 shown in FIG. 8 and receives image data in the imaging module 5 during the flash. If the external flash device 4 is undercharged, the external flash device 4 automatically performs a charging operation to flash instantly when the flash is required, and performs a flash operation according to the flash instruction when the flash instruction is received after charging is completed. The digital camera 1 indicates whether or not the external flash device 4 can flash by means of a "flash flag." The flash flag set in the RAM 6 becomes ON if the external flash device 4 can flash, while the flash flag becomes OFF if the external flash device 4 can not flash.

Figure 15:
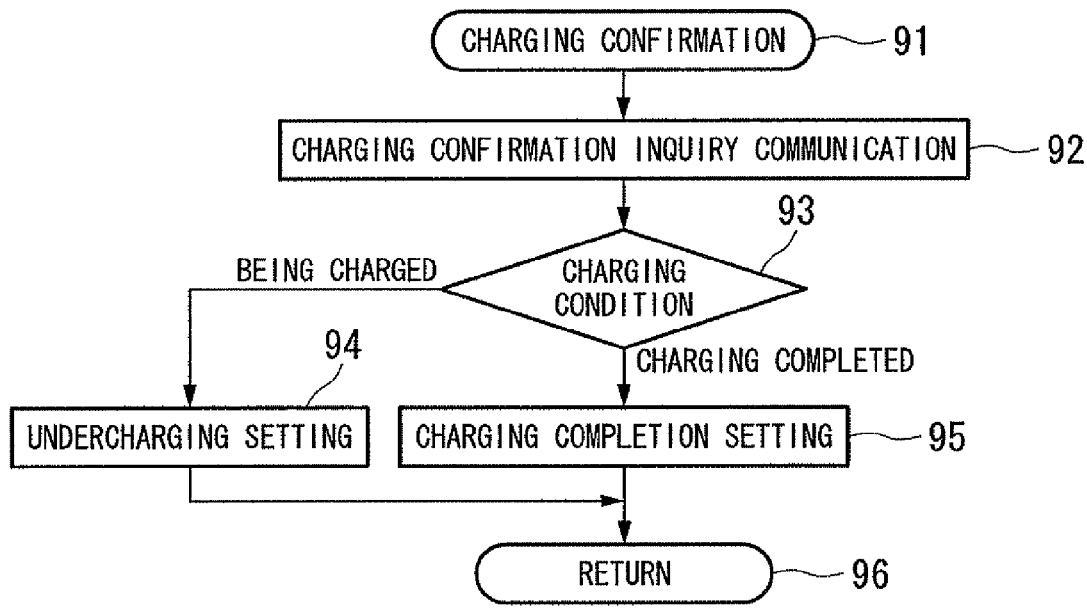
FIG. 15 is a flow chart illustrating an operation (charging confirmation process) of the digital camera included in the digital camera system according to the first embodiment of the invention.

Hereinafter, a confirmation order of the charging conditions will be described with reference to FIGS. 15 and 16. FIG. 15 is a flow chart illustrating a charging confirmation operation 91 in the digital camera 1, and FIG. 16 is a flow chart illustrating a charging report operation 97 in the external flash device 4, which corresponds to the charging confirmation operation 91.

As shown in FIG. 15, in the charging confirmation operation 91 in the digital camera 1, the CPU 9 first performs a charging confirmation inquiry communication operation 92 with the external flash device 4 via the human body communication module 11.

Subsequently, the CPU 9 confirms 93 a charging condition reported from the external flash device 4. If the external flash device 4 is being charged, the CPU 9 performs an undercharging setting operation 94 to set the flash flag to be OFF and then performs a return operation 96 to return to the operations before the stop. If the external flash device 4 has completed charging, the CPU 9 performs a charging completion setting operation 95 to set the flash flag to be ON and then performs the return operation 96 to return to the operations before the stop.

Figure 16:
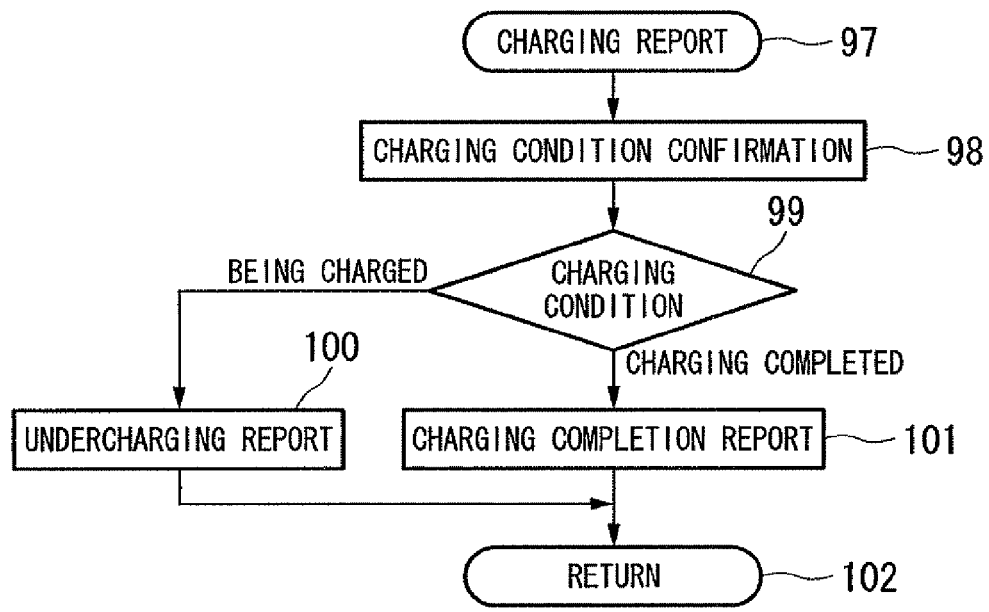
FIG. 16 is a flow chart illustrating an operation (charging report process) of the external flash device included in the digital camera system according to the first embodiment of the invention.

As shown in FIG. 16, when the charging confirmation inquiry communication operation 92 starts, the CPU 37 of the external flash device 4 performs a charging report operation 97. In the charging report operation 97, the CPU 37 first performs a charging condition confirmation operation 98. If the external flash device 4 is being charged, the CPU 37 performs an undercharging report operation 100 to inform the digital camera 1 that the external flash device 4 is being charged and then performs a return operation 102 to return to the operations before the stop. If charging has completed, the CPU 37 performs a charging completion report operation 101 to inform the digital camera 1 that the charging is completed and then performs the return operation 102 to return to the operations before the stop.

As described above, in the digital camera system of this embodiment including the digital camera 1 and the authenticating device 2, the human body communication between the digital camera 1 and the authenticating device 2 can be conducted, thereby allowing authentication of an operator and setup of the digital camera 1 with simple procedure. In addition, by confirming the operator of the digital camera 1 at each predetermined time (see FIG. 9) or each image pickup operation (see FIG. 8), it is possible to change function setup corresponding to change of an operator in the image pickup operation.

In addition, by performing a permission setting operation related to permission of operation of the function of the digital camera 1, it is possible to limit an unauthorized person from changing the operation contents, thereby improving security. In addition, by performing the permission setting operation, it is possible to automatically limit functions for each operator, thereby securing data for each operator even when a number of operators use the same digital camera 1.

In addition, since individual authentication is automatically performed when the digital camera 1 is powered on (see FIG. 6), time taken for the individual authentication is reduced, thereby improving operability. In addition, since the image pickup is set according to an operator authenticated when the digital camera 1 is powered on, an initial setup to comply with the operator's performance is achieved (see FIG. 6), thereby improving operability. In addition, since it is possible to automatically reset image pickup settings updated during the image pickup operation when the digital camera 1 is powered on later (see FIGS. 11 and 12), time taken for setting the image pickup can be reduced, thereby improving operability.

In addition, in the digital camera system of this embodiment including the digital camera 1 and the remote controller 3, since it is possible to operate the remote controller 3 using the human body communication, wirings such as a wired remote controller is not needed, thereby improving convenience. In addition, since the human body becomes a communication path, a positional relationship between the remote controller 3 and the digital camera 1 can be freely set. Accordingly, it is possible to perform an operation that is difficult to be performed by a conventional remote controller using infrared communication in which an operator holds a camera with one hand while operating the remote controller with other hand, thereby improving convenience.

In addition, in the digital camera system of this embodiment including the digital camera 1 and the external flash device 4, since it is possible to inform the strobe flash timing using human body communication, wiring is not needed, thereby improving convenience.

Figure 17:
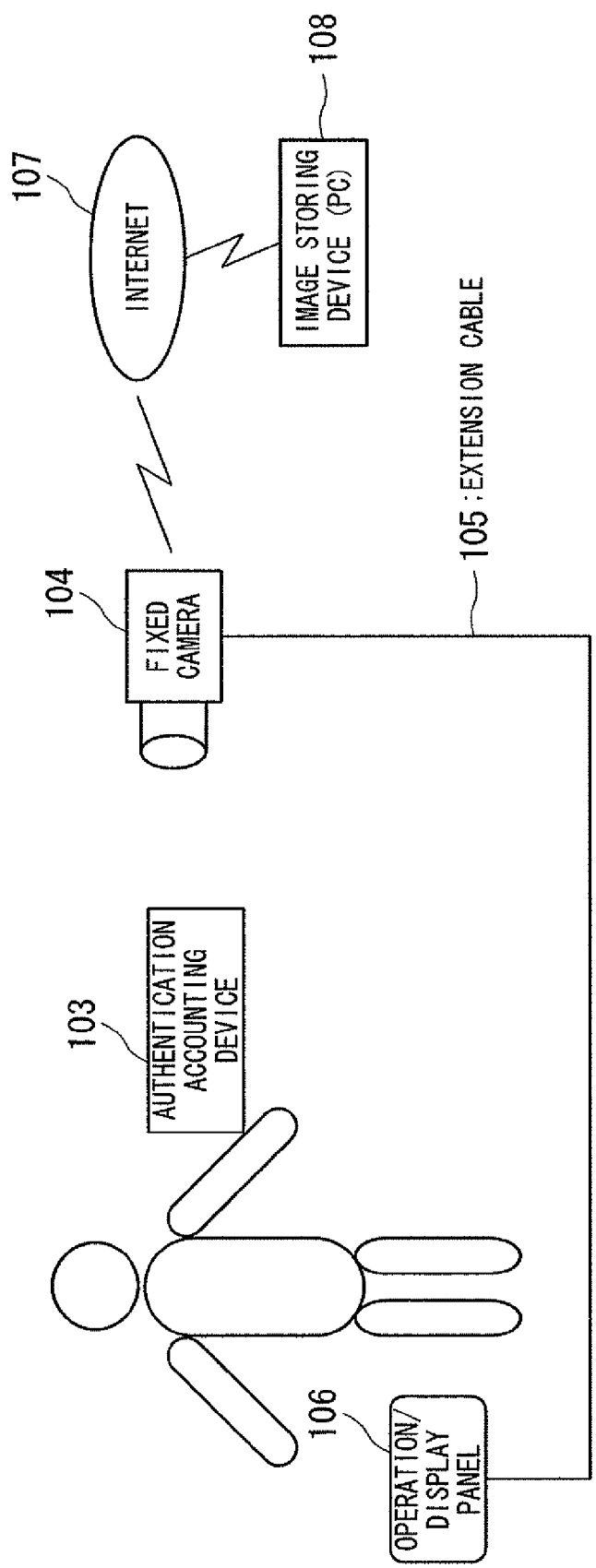
FIG. 17 is a block diagram showing a configuration of a digital camera system according to a second embodiment of the invention.

Hereinafter, a second embodiment of the invention will be described. FIG. 17 shows a configuration of a digital camera system according to a second embodiment of the invention. A fixed camera 104 (digital camera unit) as a digital camera is installed in place. An authentication accounting device 103 (authentication unit) permits the fixed camera to pick up an image and manages accounting data related to accounting that accompanies the image pickup. An operation/display panel 106 is connected to the fixed camera 104 via an extension cable. The operation/display panel 106 controls an operation of the fixed camera 104 and communicates with the authentication accounting device 103 via a human body.

The fixed camera 104 is connected to the Internet 107 (electrical communication network). In addition, an image storing device 108 (image storage unit) such as a personal computer having a recording medium in which image data can be stored is connected to the Internet 107. The authentication accounting device 103 and the operation/display panel 106 have respective human body communication functions so that communication between the authentication accounting device 103 and the operation/display panel 106 carried by an operator who is distant from the fixed camera 104 can be conducted.

As described above, since the fixed camera 104 is connected to the image storing device 108 via the Internet 107, it is possible to store and deliver picked up image data. With this configuration, in the digital camera system of the second embodiment, it is possible to pick up an image by means of the fixed camera 104 according to an instruction from the operator who carries the authentication accounting device 103 and touches the operation/display panel 106, confirm the picked up image data from the operation/display panel 106, and store the image data in the image storing device 108 on the Internet 107. Since an Internet address of the image storing device 108 is recorded in the authentication accounting device 103 and this address is delivered to the fixed camera 104 through the operation/display panel 106, it is possible to store the picked up image data in the image storing device 108.

Figure 18:
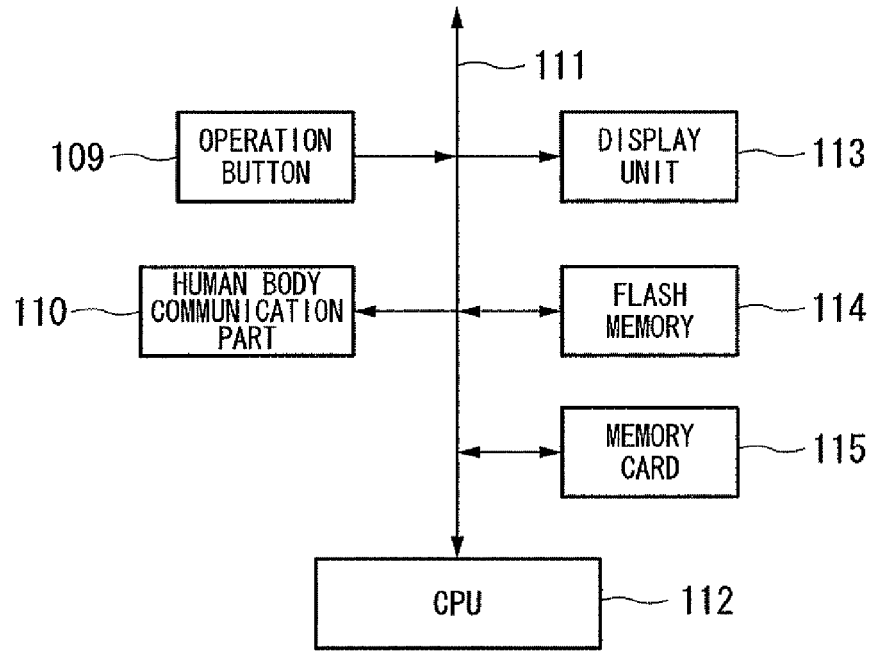
FIG. 18 is a block diagram showing a configuration of an authentication accounting device included in the digital camera system according to the second embodiment of the invention.

FIG. 18 shows a configuration of the authentication accounting device 103. Accounting data related to permission of image pickup of the fixed camera 104 are stored in a memory card 115. The accounting data includes data related to use fees, data of available services, data of service use conditions, etc. In addition, since every operator manages the accounting, the accounting data and authentication data are stored in the memory card 115 in pairs, that is, with association therebetween. The accounting data stored in the memory card 115 is updated after every image is picked up. In addition, destination data (address information) of the picked up image data is stored in the memory card 115. Since every operator manages the destination of the image data, the address information of the destination and the authentication data are stored in the memory card 115 in pairs, that is, with association therebetween.

A flash memory 114 and the memory card 115 are connected to a data bus 111. A CPU 112, an operation button 109, a display unit 113 and a human body communication unit 110 are also connected to the data bus 111. A control program of the CPU 112 is stored in the flash memory 114. The authentication accounting device 103 can operate the fixed camera 104, operation contents instructed through the operation button 109 are detected by the CPU 112, and the fixed camera 104 is informed of the detected operation contents via the human body communication unit 110. The display unit 113 displays operation conditions of the fixed camera 104 and the accounting data.

Figure 19:
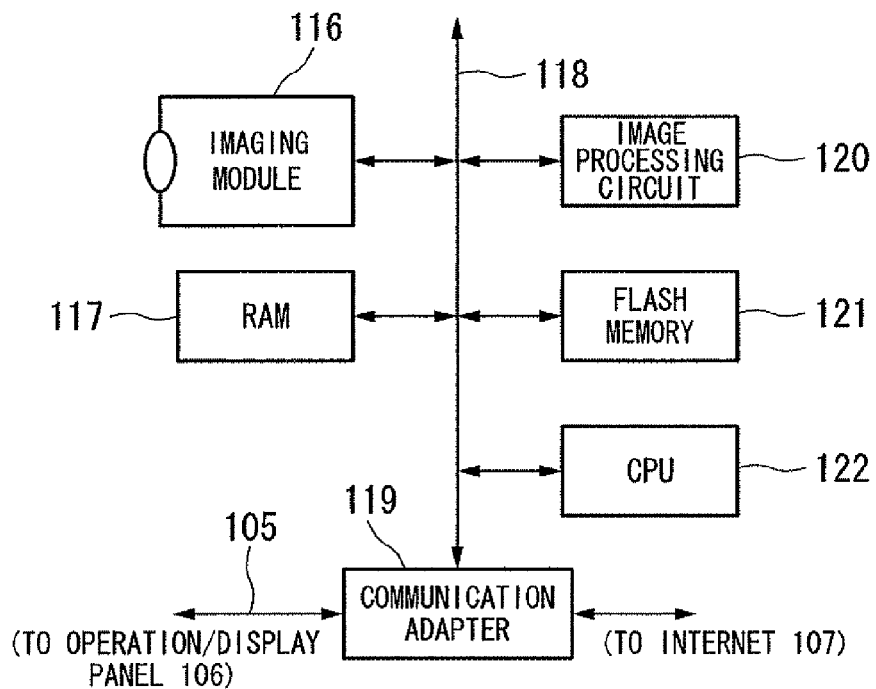
FIG. 19 is a block diagram showing a configuration of a fixed camera included in the digital camera system according to the second embodiment of the invention.

FIG. 19 shows a configuration of the fixed camera 104. An imaging module 116 picks up an object image to generate image data. A RAM 117 is used as a work memory.

An image processing circuit 120 performs various image processes for the image data generated by the imaging module 116. A communication adapter 119 conducts human body communication with the operation/display panel 106 and the authentication accounting device 103 via the extension cable 105 while conducting communication with the Internet 107. A flash memory 121 is stored with a program for operation of the CPU 122 and various setting values. The CPU 122 controls the fixed camera as a whole. The above components are connected to a data bus.

Operator authentication is performed based on a result of the human body communication between the fixed camera 104 and the authentication accounting device 103, as in the first embodiment. If image pickup is approved according to the communication with the authentication accounting device 103 carried by the operator, the fixed camera 104 picks up an image according to an instruction from the operation/display panel 106 or the authentication accounting device 103. Since authentication data and setup data of the operator are transmitted from the authentication accounting device 103 to the fixed camera 104 before starting to pick up the image, according to received data, the image pickup is permitted or image data is stored or delivered after the image pickup in the fixed camera 104.

If the operator authentication is successful, the fixed camera 104 requests the authentication accounting device 103 to provide accounting data. Information related to the request of the accounting data is transmitted from the fixed camera 104 to the operation/display panel 106 via the extension cable 105, and then transmitted from the operation/display panel 106 to the authentication accounting device 103 by the human body communication. The authentication accounting device 103 transmits the accounting data by request. The accounting data is transmitted to the fixed camera 104 via a path opposite of the above path. The CPU 122 of the fixed camera 104 takes the accounting data received in the communication adapter 119 and limits function content related to the object image pickup according to the accounting data. For example, if the minimum fee required to receive a service related to the image pickup is deposited, the CPU 122 permits the image pickup. If the minimum fee required to receive a service related to the image pickup is not deposited, the CPU 122 does not approve the image pickup or approves the image pickup on a limited-basis.

After the image pickup, the image pickup data is displayed on the operation/display panel 106 through which the operator instructs an operation. If the operator instructs storage of the image data, the image data is transmitted to and stored in the image storing device 108 via the Internet 107. In authentication or after the image pickup, address information of the image data destination is transmitted from the authentication accounting device 103 to the fixed camera 104, and the CPU 122 of the fixed camera 104 transmits the image data to the image storing device 108 identified by the address information.

If the operator instructs that the image be retaken, the image data is discarded and a new image is picked up.

According to the above described processes, an image pickup service can be offered to only an authorized operator, and picked up image data can be delivered to a desired device connected to the Internet. In addition, in the case of a digital camera system that takes a commemorative photograph or the like for a fee, since accounting data can be easily managed and the image data can be stored in a storing device, it is possible to construct a convenient system.

As described above, according to the invention, since the human body communication is conducted between the digital camera unit and the authenticating unit, it is possible to control setup of the digital camera unit with a simple procedure.

In addition, since it is possible to operate the digital camera unit remotely using the human body communication conducted between the digital camera unit and the operation terminal unit, wirings are not needed, thereby improving convenience. In addition, since it is possible to inform the flash unit of the flash timing using the human body communication conducted between the digital camera unit and the flash unit, wiring is not necessary, thereby improving convenience.

Although a preferable exemplary embodiments of the present invention have been shown and described, the present invention do not limited to these embodiments, and addition, omission, substitution and change may be made in these exemplary embodiments without departing from the principles and spirit of the invention. That is, the present invention do not limited to the above explanations, and the scope of which is only defined in the appended claims and their equivalents.

INDUSTRIAL APPLICABILITY

According to the present invention, since the human body communication is conducted between the digital camera unit and the authenticating unit, it is possible to control setup of the digital camera unit with a simple procedure. In addition, since it is possible to operate the digital camera unit remotely using the human body communication conducted between the digital camera unit and the operation terminal unit, wiring is not necessary, thereby improving convenience.

The invention claimed is:
1. A digital camera system comprising:
a digital camera unit; and
an authenticating unit in which setup control data and personal authentication data to identify an operator of the digital camera unit is stored,
wherein the digital camera unit includes:
an imaging module that picks up an object image to generate image data;
a first human body communication module that conducts communication via the human body of the operator;
a first storage device in which a personal authentication data list to identify an authorized operator is stored; and
a first controller that performs a setup operation related to at least one of a plurality of functions of the digital camera unit according to the setup control data received from the authenticating unit by the first human body communication module, only when the personal authentication data received from the authenticating unit by the first human body communication module is included in the personal authentication data list stored in the first storage device, and
wherein the authenticating unit includes:
a second human body communication module that conducts communication via the human body;
a second storage device in which the setup control data and the personal authentication data are stored; and
a second controller that causes the setup control data and the personal authentication data to be transmitted to the digital camera unit via the second human body communication module.

2. The digital camera system according to claim 1, wherein at least one of the first and second controllers performs a determination operation which determines whether the communication via the human body can be conducted, on a periodical basis, and at least the personal authentication data in the second storage device is transmitted to the digital camera unit if the communication via the human body can be conducted, and
wherein the first controller sets the function of the digital camera unit so as to permit an operation of the digital camera unit without limitation or permit the operation of the digital camera unit with limitation of operation contents thereof, based on the setup control data after the determination operation.

3. The digital camera system according to claim 1, wherein at least one of the first and second controllers performs a determination operation which determines whether the communication via the human body can be conducted, when power is inputted, and at least the personal authentication data in the second storage device is transmitted to the digital camera unit if the communication via the human body can be conducted, and
wherein the first controller sets the function of the digital camera unit so as to permit an operation of the digital camera unit without limitation or permit the operation of the digital camera unit with limitation of operation contents thereof, based on the setup control data after the determination operation.

4. The digital camera system according to claim 2 or 3, wherein the setup control data which is transmitted to the digital camera unit after the determination operation includes a parameter of a function related to the object image pickup, and the first controller sets the function related to the object image pickup of the digital camera unit, based on the parameter.

5. The digital camera system according to claim 4, wherein the second storage device is stored with the setup control data including the parameter of the function related to the object image pickup, and the personal authentication data, with the setup control data and the personal authentication data being paired, and
wherein the first controller updates the parameter being stored in the second storage device, via the first and second human body communication modules.

6. The digital camera system according to claim 1,
wherein the second storage device is stored with the personal authentication data and accounting data, with the personal authentication data and the accounting data being paired, and
wherein the first controller limits contents of the function related to the object image pickup, based on the accounting data.

7. The digital camera system according to claim 1,
wherein the second storage device stores with address information of an image storing unit, in which the image data generated by the digital camera unit is stored, the image storing unit being connected to the digital camera unit via an electrical communication network, and personal authentication data, with the address information and the personal authentication data being paired.

8. The digital camera system according to claim 1, further comprising:
an operation terminal unit that operates the digital camera unit remotely,
wherein
first controller performs an operation according to an operation instruction to control at least one of the timing of a shutter and a zoom function of a lens, the shutter and the lens are provided within the imaging module, information related to the timing and the zoom function is received from the operation terminal unit by the first human body communication module, and
wherein the operation terminal unit includes:
a third human body communication module that conducts communication via the human body;
an input unit that inputs the operation instruction; and
a third controller that causes the operation instruction to be transmitted to the digital camera unit via the third human body communication module.

9. The digital camera system according to claim 1,
wherein at least one of the first and second controllers performs a determination operation which determines whether the communication via the human body can be conducted, depending on an image pickup operation of the digital camera unit, and at least the personal authentication data in the second storage device is transmitted to the digital camera unit if the communication via the human body can be conducted.

10. A digital camera system comprising:
a digital camera unit; and
a flash unit that provides a flash function to the digital camera unit, wherein the digital camera unit includes:
an imaging module that picks up an object image to generate image data;
a first human body communication module that conducts communication via a human body; and
a first controller that causes a flash initiation instruction to control the flash timing of the flash unit to be transmitted to the flash unit via the first human body communication module, and
wherein the flash unit includes:
a second human body communication module that conducts communication via the human body; and
a second controller that controls the flash based on the flash initiation instruction received from the digital camera unit to the second human body communication module.

11. A digital camera system comprising:
a digital camera unit; and
an authenticating unit in which unique setup control data of the digital camera unit is stored,
wherein the digital camera unit includes:
an imaging module that picks up an object image to generate image data;
a first human body communication module that conducts communication via a human body; and
a first controller that performs a setup operation related to at least one of a plurality of functions of the digital camera unit according to the setup control data received from the authenticating unit by the first human body communication module, and
wherein the authenticating unit includes:
a second human body communication module that conducts communication via the human body;
a setup control data storing unit in which the setup control data is stored; and
a second controller that causes the setup control data to be transmitted to the digital camera unit via the second human body communication module, and
wherein the setup control data storing unit is stored with address information of an image storing unit in which the image data generated by the digital camera unit is stored, the image storing unit being connected to the digital camera unit via an electrical communication network, and authentication data to identify an operator, the address information and the authentication data being paired.

* * * * *